United States Patent

[11] 3,560,770

[72] Inventor Joannes Paulus Maria Gieles
Emmasingel, Eindhoven, Netherlands
[21] Appl. No 693,945
[22] Filed Dec. 27, 1967
[45] Patented Feb. 2, 1971
[73] Assignee U.S. Philips Corporation
New York, N.Y.
a corporation of Delaware. by mesne assignment
[32] Priority Jan. 5, 1967
[33] Netherlands
[31] 6700144

[54] TEMPERATURE CORRECTION OF A LOGIC CIRCUIT ARRANGEMENT
3 Claims, 4 Drawing Figs.

[52] U.S. Cl. 307/310, 330/23, 330/69; 307/214, 307/215
[51] Int. Cl. H03f 1/30
[50] Field of Search 330/69, 23; 307/310,270

[56] References Cited
UNITED STATES PATENTS

| | | | |
|---|---|---|---|
| 3,046,487 | 7/1962 | Matzen et al. | 330/69 |
| 3,182,269 | 5/1965 | Smith | 330/69 |
| 3,419,810 | 12/1968 | Xylander | 330/23 |
| 3,431,508 | 4/1969 | Soltz et al. | 330/69 |
| 3,310,688 | 3/1967 | Ditkofsky | 330/69 |
| 3,414,834 | 12/1968 | Stubbs | 330/69 |
| 3,435,362 | 3/1969 | Pamlenyi | 330/69 |

*Primary Examiner*—Donald D. Forrer
*Assistant Examiner*—Harold A. Dixon
*Attorney*—Frank R. Trifari

ABSTRACT: A temperature compensated logic circuit having two transistors with commonly connected emitters and a third transistor, the collector-emitter path of which connects the emitters of the two transistors through a resistance to one terminal of a two terminal source of supply. A voltage divider having two taps is connected between the terminals, one tap being connected to the base electrode of one of the two emitter-connected transistors. The temperature compensation is through a barrier layer connecting the base electrode of the third transistor to the other divider tap, while a resistance further connects the base electrode of the third transistor to the other supply terminal.

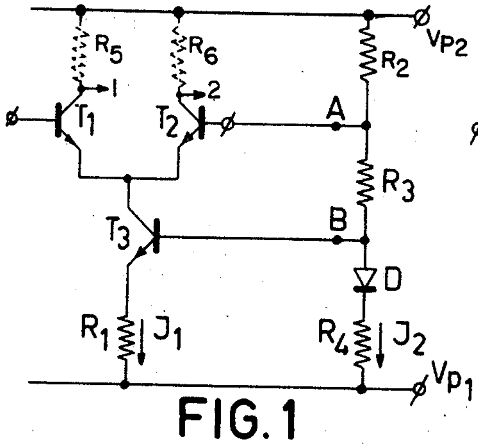
FIG. 1
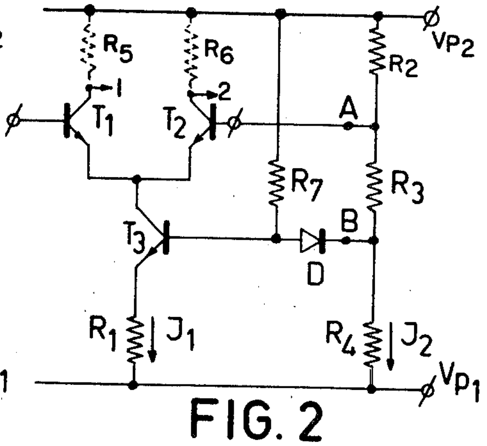
FIG. 2
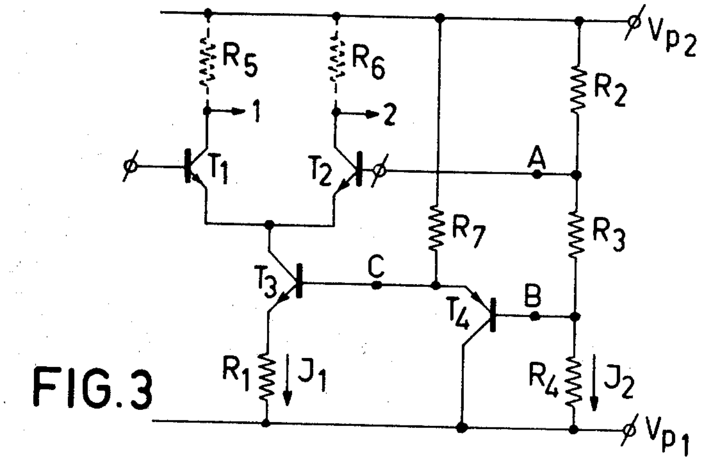
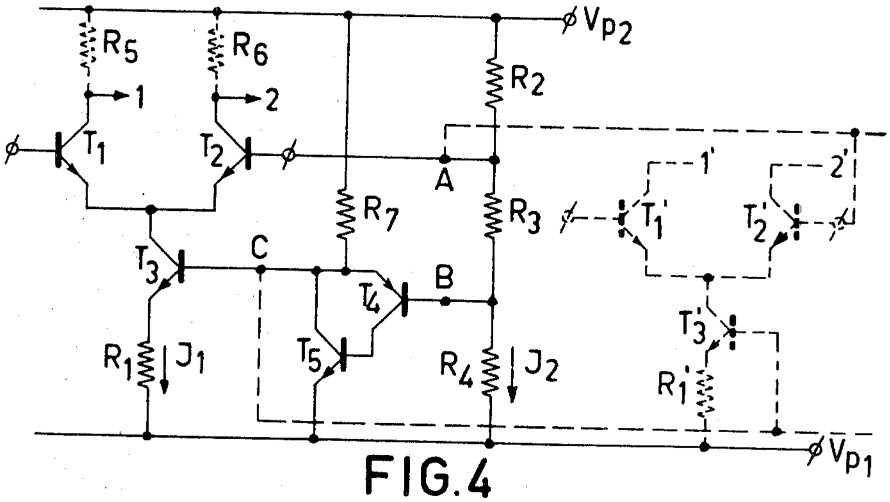
FIG. 4
INVENTOR
JOANNES P. M. GIELES
BY Frank R. Jufari
AGENT

TEMPERATURE CORRECTION OF A LOGIC CIRCUIT ARRANGEMENT

The invention relates to logic circuit arrangements and particularly to integratable logic circuits employing temperature-corrected solid-state elements.

A typical logic circuit arrangement may employ two transistors having their emitters connected to each other and then connected, through the emitter-collector junction of a third transistor and an emitter-resistor, to a first terminal of a source of supply. The base of one of the two first-mentioned transistors and the base of the third transistor are coupled through different taps on a voltage divider connected between the terminals of the source of supply voltage, and a barrier layer is connected in series with the voltage divider between the base of the third transistor and the first terminal of the source of supply in a circuit extending through a first voltage divider tap. The barrier layer, viewed from the base of the third transistor, has a pass direction which is equal to that of the base-emitter junction of the third transistor.

In such circuit arrangements, which are sometimes referred to as "long-tailed pair," a signal is applied to the base of one of the two first-mentioned transistors and a reference voltage is applied to the base of the other transistor of the pair. The reference voltage may be derived from the voltage divider. Output signals may be derived from the collector circuit. The function of the third transistor is to keep the overall emitter current of the two other transistors at a predetermined constant value. The intensity of this current is determined by the value of the emitter-resistor of the third transistor, by the base voltage of the third transistor derived from the voltage divider and by the emitter-base junction voltage of the third transistor. A temperature variation will result in a variation of the voltage across the emitter-base junction of the third transistor, since this voltage is strongly temperature dependent. If the base voltage should be kept at a constant value by the voltage divider, the adjustment of the transistor and hence the current through the common emitter circuit will vary.

This disadvantage is mitigated by connecting a temperature-dependent barrier layer in series with the voltage divider between a first tap and the first terminal of the source of supply. The barrier layer, viewed from the tapping, has the same pass direction as the base-emitter junction of the third transistor. This solution has a disadvantage, however, in that a temperature variation results in a variation of the voltage at the other tap on the voltage divider.

It is the object of this invention to provide an arrangement which is substantially free of voltage variation with variation in temperature.

In the circuit arrangement according to the invention, a barrier layer is connected between the base of the third transistor and a first tap on the voltage divider and the base of the third transistor is connected through a resistor to a second terminal of the source of supply.

The invention will be described more fully with reference to the FIGS.

FIG. 1 shows the known circuit. The emitters of the transistors $T_1$ and $T_2$ are connected to each other and through the transistor $T_3$ and the resistor $R_1$ to the first terminal $V_{p1}$ of a source of supply (not shown). The bases of the transistors $T_2$ and $T_3$ are respectively coupled to the taps A and B on the voltage divider, which in turn is made up of the series connection of resistors $R_2$, $R_3$, a diode D, and the resistor $R_4$, connected between the terminals $V_{p2}$ and $V_{p1}$ of the source of supply.

The input signal is applied to the base of the transistor $T_1$. The collectors of the transistors $T_1$ and $T_2$ are connected to the outputs 1 and 2, respectively, and through loads $R_5$ and $R_6$, respectively, to the second terminal $V_{p2}$ of the voltage source.

For the current in the circuit $V_{p1}$–$T_3$B–$V_{p1}$, it holds that: $-I_{11}-V+V_D I_2 R A Y4=0$, where $V_{be}$ and $V_D$ represents the temperature-dependent barrier-layer voltages between the base and emitter of transistor $T_3$ and of the diode D. Since the barrier layer, viewed from point B, have the same pass direction and substantially the same temperature, the two barrier-layer voltages compensate each other so that it holds that:

$$I_1 = R_4 \ I_2 / R.$$

Since the diode D is connected in series with the voltage divider, the current $I_2$ still depends to a certain, though small extent upon the barrier-layer voltage of the diode D and hence upon temperature. The compensation of the current $I_1$ is not ideal and the reference voltage at the tap A is still temperature dependent to a certain extent.

FIG. 2 shows an embodiment of the circuit arrangement according to the invention. In this FIG., corresponding elements are denoted by the same reference numerals as in FIG. 1. As is apparent from the FIG., the diode D is connected between the base of transistor $T_3$ and the tapping B on the voltage divider $R_2$, $R_3$, $R_4$. In order to produce a base current in transistor $T_3$ and the current through the diode D, the base of transistor $T_3$ is connected through resistor $R_7$ to the second terminal $V_{p2}$ of the source of supply. Also in this circuit arrangement, it holds that:

$$I_1 = R_4 \ I_2 / R1.$$

Since in this case, the current $I_2$ through resistor $R_4$ is substantially independent of the voltage across the barrier layers, the compensation of the current $I_2$. is approximately ideal and the voltage at point A is constant. However, the current through the diode D still exerts a certain influence on the current $I_2$. The influence decreases as the ratio between the current derived from the tap and the rest current in the voltage divider becomes smaller. In order to further reduce this influence, in the circuit arrangement shown in FIG. 3, the diode is replaced by a transistor $T_4$ which is complementary to the transistor $T_3$. The emitter of transistor $T_4$ is connected to the base of transistor $T_3$ and the base of transistor $T_4$ to the tap B, while the collector is connected to the terminal $V_{p1}$ of the source of supply. Since the base current of transistor $T_4$ is considerably smaller than the emitter current, only a very small current flows from the tap B when compared with FIG. 2.

In the circuit arrangement of FIG. 4, this influence is further reduced by a further transistor $T_5$ which provides a higher current amplification and hence a smaller base current of transistor $T_4$. Consequently, the voltage divider may be high-ohmic, which is important with regard to allowing dissipation, as a result of which the temperatures of the integrated circuit arrangements is not raised unnecessarily. The voltage divider may now be used for feeding several "long-tailed pair" circuit arrangements. Moreover, the combination of transistors $T_4$ and $T_3$ and resistor $R_7$ may be used for several circuits by branching at point C of FIG. 4. It is then required that the temperatures of the "long-tailed pair" circuit arrangements should be equal.

The above cited embodiments are intended as exemplary only, and while I have described my invention with a specific application and embodiment thereof, other modifications will be apparent to those skilled in the art without departing from the spirit and scope of the invention as defined by the appended claims.

I claim:

1. A temperature-compensated logic circuit arrangement comprising first, second and third transistors, said first and second transistors having their respective emitters connected to each other and through the series circuit of the collector-emitter junction of said third transistor and an emitter-resistor to a first terminal of a two-terminal source of supply, means connecting the collectors of said first and second transistors to the second terminal of said two-terminal source of supply, a voltage divider connected between said two terminals and having two taps, the base of one of said first and second transistors being coupled to one of said taps, a barrier layer connecting the base of the third transistor to the other of said voltage divider taps, said barrier layer having the same pass direction as that of the base-emitter junction of said third transistor, when viewed from the base of said third transistor, and a resistor connecting the base of the third transistor to said second terminal of said source of supply.

2. A circuit arrangement as claimed in claim 1, wherein said barrier layer constitutes the emitter-base junction of a fourth transistor which is complementary to said third transistor, and means connecting the collector of said fourth transistor to the first terminal of said source of supply.

3. The combination of claim 2, wherein said last named means includes a fifth transistor having its base connected to the collector of said fourth transistor, its collector connected to the emitter of said fourth transistor, and its emitter connected to said first terminal.

PO-1050
(5/69)

UNITED STATES PATENT OFFICE
CERTIFICATE OF CORRECTION

Patent No. 3560770 Dated February 2, 1971

Inventor(s) JOANNES PAULUS MARIA GIELES

It is certified that error appears in the above-identified patent and that said Letters Patent are hereby corrected as shown below:

Col. 1, line 70, "$-I_{11}-V+V_D I_2$RAy4=0" should read

-- $-I_1R_1-V_{be}+V_D+I_2R_4=0$ --

Col. 2, line 21, "$I_2$" should read -- $I_1$ --.

Signes and sealed this 15th day of August 1972.

(SEAL)
Attest:

EDWARD M. FLETCHER, JR.
Attesting Officer

ROBERT GOTTSCHALK
Commissioner of Patent